US012472947B2

(12) United States Patent
Hayasaka et al.

(10) Patent No.: US 12,472,947 B2
(45) Date of Patent: Nov. 18, 2025

(54) CONTROL APPARATUS FOR ELECTRIC VEHICLE

(71) Applicant: TOYOTA JIDOSHA KABUSHIKI KAISHA, Toyota (JP)

(72) Inventors: Akihito Hayasaka, Nisshin (JP); Seiji Masunaga, Toyota (JP); Masayuki Matsui, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/483,616

(22) Filed: Oct. 10, 2023

(65) Prior Publication Data
US 2024/0190436 A1 Jun. 13, 2024

(30) Foreign Application Priority Data
Dec. 7, 2022 (JP) .................................. 2022-195968

(51) Int. Cl.
*B60W 30/18* (2012.01)
*B60K 6/52* (2007.10)
(Continued)

(52) U.S. Cl.
CPC ......... *B60W 30/18063* (2013.01); *B60K 6/52* (2013.01); *B60K 17/3462* (2013.01);
(Continued)

(58) Field of Classification Search
CPC .... B60W 10/08; B60W 10/024; B60W 10/10; B60W 10/14; B60W 20/15; B60W 2031/0091; B60W 30/16; B60W 30/146; B60W 30/18; B60W 30/18063; B60W 30/182; B60W 2300/18;
(Continued)

(56) References Cited

U.S. PATENT DOCUMENTS 9,248,758 B2 * 2/2016 Yamazaki ............... B60L 50/61
11,981,200 B2 * 5/2024 Akiyama .............. B60W 10/12
(Continued)

FOREIGN PATENT DOCUMENTS

JP 2012-16168 A 1/2012
JP 2022-112448 A 8/2022

*Primary Examiner* — Andrew Joseph Rudy
(74) *Attorney, Agent, or Firm* — Oblon, McClelland, Maier & Neustadt, L.L.P.

(57) ABSTRACT

A control apparatus for an electric vehicle that includes (i) an electric motor, (ii) a high-low switching device configured to establish a high gear position or a low gear position, (iii) a center differential configured to transmit rotation outputted from the high-low switching device, to the front and rear wheels, while allowing differential rotation between the front and rear wheels, and (iv) a high-low selection device configured to select the high gear position or low gear position that is to be established in the high-low switching device. The control apparatus includes a creep control portion configured to execute a creep control for generating a creep torque during stop of the vehicle. The creep control portion executes a creep cut for stopping the creep control under a predetermined constant condition, and stops the execution of the creep cut when the low gear position is selected during execution of the creep cut.

4 Claims, 5 Drawing Sheets

(51) Int. Cl.
*B60K 17/346* (2006.01)
*B60K 17/356* (2006.01)
*B60W 10/02* (2006.01)
*B60W 10/08* (2006.01)
*B60W 10/10* (2012.01)
*B60W 10/14* (2012.01)
*B60W 20/15* (2016.01)
*B60W 30/182* (2020.01)
*F16H 63/46* (2006.01)
*F16H 63/50* (2006.01)
*B60K 6/48* (2007.10)

(52) U.S. Cl.
CPC ......... *B60K 17/356* (2013.01); *B60W 10/024* (2020.02); *B60W 10/08* (2013.01); *B60W 10/10* (2013.01); *B60W 10/14* (2013.01); *B60W 20/15* (2016.01); *B60W 30/182* (2013.01); *F16H 63/46* (2013.01); *F16H 63/50* (2013.01); *B60K 6/48* (2013.01); *B60K 2006/4825* (2013.01); *B60W 2300/18* (2013.01); *B60W 2510/1005* (2013.01); *B60W 2710/02* (2013.01); *B60W 2710/081* (2013.01); *B60W 2710/083* (2013.01); *B60Y 2200/92* (2013.01); *F16H 2312/06* (2013.01)

(58) Field of Classification Search
CPC ..... B60W 2510/1005; B60W 2510/02; B60W 2510/30; B60W 2540/215; B60W 2710/081; B60W 2710/083; B60K 6/48; B60K 6/52; B60K 17/3462; B60K 17/356; B60K 2031/0091; B60K 25/00; B60K 31/00; B60K 2006/4825; F16H 23/1206; F16H 231/06; F16H 263/46; F16H 63/50; E02F 9/2025; E02F 9/26
USPC .......................................................... 701/22
See application file for complete search history.

(56) References Cited

U.S. PATENT DOCUMENTS

| 11,993,243 | B2* | 5/2024 | Kawamata | ........... B60W 10/119 |
| 12,110,004 | B2* | 10/2024 | Aratake | ................ B60W 20/30 |
| 2013/0090799 | A1 | 4/2013 | Nakamura et al. | |
| 2022/0227348 | A1* | 7/2022 | Aratake | ................ B60W 20/30 |
| 2022/0227350 | A1 | 7/2022 | Aratake | |

* cited by examiner

| RUNNING MODE | HIGH-LOW SWITCHING DEVICE | DIFFERENTIAL-LOCK CLUTCH | CREEP CUT |
|---|---|---|---|
| H4F | HIGH GEAR | FREE | ALLOWED |
| H4L | HIGH GEAR | DIFFERENTIAL LOCK | INHIBITED |
| L4F | LOW GEAR | FREE | INHIBITED |
| L4L | LOW GEAR | DIFFERENTIAL LOCK | INHIBITED |

CONTROL APPARATUS FOR ELECTRIC VEHICLE

This application claims priority from Japanese Patent Application No. 2022-195968 filed on Dec. 7, 2022, the disclosure of which is herein incorporated by reference in its entirety.

FIELD OF THE INVENTION

The present invention relates to a control apparatus for an electric vehicle that is configured to generate a creep torque by controlling an electric motor.

BACKGROUND OF THE INVENTION

Patent Document 1 discloses a control apparatus for an electric vehicle that includes an electric motor as a power source, wherein the control apparatus includes a creep control portion configured to executes a creep control for controlling the electric motor to generate a creep torque during stop of the vehicle, and to execute a creep cut for stopping the creep control under a predetermined constant condition. In the control apparatus disclosed in Patent Document 1, when a running speed of the vehicle becomes lower than a predetermined creep-cut inhibition speed during execution of the creep control, execution of the creep cut is inhibited regardless of satisfaction of a creep-cut allowance condition.

PRIOR ART DOCUMENT

Patent Document

[Patent Document 1]
Japanese Patent Application Laid-Open No. 2012-16168

SUMMARY OF THE INVENTION

By the way, there is known an electric vehicle including (i) a high-low switching device configured to establish one of a high gear position and a low gear position by operation of a dog clutch so as to change a speed of rotation outputted from the power source with one of two gear ratios which corresponds to the established one of the high gear position and the low gear position, (ii) a center differential configured to transmit the rotation outputted from the high-low switching device, to the front and rear wheels, while allowing differential rotation between the front and rear wheels, (iii) a differential lock device configured to limit allowance of the differential rotation by the center differential, (iv) a high-low selection device configured to select one of the high gear position and the low gear position which is to be established in the high-low switching device, and (v) a differential-state selection device configured to place the center differential in a selected one of a free state in which the differential rotation is not limited and a differential lock state in which the differential rotation is limited by the differential lock device. In such an electric vehicle, switching can be made among four running modes including an H4F mode in which the high-low switching device is in the high gear position and the center differential is in the free state, an H4L mode in which the high-low switching device is in the high gear position and the center differential is in the differential lock state, an L4F mode in which the high-low switching device is in the low gear position and the center differential is in the free state, and an L4L mode in which the high-low switching device is in the low gear position and the center differential is in the differential lock state. In this switching arrangement, although it is not known yet, it might be possible to allow the execution of the creep cut in the H4F mode in order to reduce power loss and improve fuel economy, and to inhibit the execution of the creep cut in the H4L mode, L4F mode and L4L mode in order to give higher priority to power performance rather than to fuel economy because the H4L mode, L4F mode and L4L mode are often selected to improve drivability in places with poor road conditions.

However, when the low gear position is selected by the high-low selection device in the H4F mode with the creep cut being executed and the high gear position is to be switched to the low gear position by operation of the dog clutch, even if the dog clutch is placed in its neutral state, its input-side rotation is stopped by execution of the creep cut and its output-side rotation is stopped by stop of the vehicle. Therefore, there is a possibility that low-gear-side meshing teeth cannot mesh in the dog clutch, so that the high-low switching device cannot be switched to the low gear position.

An object of the present invention is to enable the high-low switching device to be appropriately switched to the low gear position when the low gear position is selected by the high-low selection device during execution of the creep cut.

According to a first aspect of the present invention, there is provided a control apparatus for an electric vehicle that includes (i) front and rear wheels, (ii) an electric motor as a power source, (iii) a high-low switching device configured to establish one of a high gear position and a low gear position by operation of a dog clutch so as to change a speed of rotation outputted from the power source with one of two gear ratios which corresponds to the established one of the high gear position and the low gear position, (vi) a center differential configured to transmit the rotation outputted from the high-low switching device, to the front and rear wheels, while allowing differential rotation between the front and rear wheels, and (v) a high-low selection device configured to select one of the high gear position and the low gear position which is to be established in the high-low switching device. The control apparatus includes a creep control portion configured to execute a creep control for controlling the electric motor such that a creep torque is generated during stop of the vehicle. The creep control portion is configured to execute a creep cut for stopping the creep control under a predetermined constant condition, and is configured, when the low gear position is selected by the high-low selection device during execution of the creep cut, to stop the execution of the creep cut.

According to a second aspect of the present invention, in the control apparatus according to the first aspect of the invention, the electric vehicle is a hybrid electric vehicle that includes (vi) an engine as another power source in addition to the electric motor and (vii) a torque converter provided between the power sources and the high-low switching device. The creep control portion is configured to cause the torque converter to generate the creep torque by rotating the electric motor at a predetermined speed, and to execute the creep cut by stopping rotation of the electric motor.

According to a third aspect of the present invention, in the control apparatus according to the first or second aspect of the invention, the electric vehicle includes (vi) a differential lock device configured to limit allowance of the differential rotation by the center differential, and (vii) a differential-state selection device configured to select one of a free state in which the differential rotation is not limited and a differential lock state in which the differential rotation is limited by the differential lock device. The control apparatus includes a running-mode switching control portion configured to switch among four running modes in accordance with selections made by the high-low selection device and the differential-state selection device, wherein the four running modes including a H4F mode in which the high-low switching device is in the high gear position and the center differential is in the free state, a H4L mode in which the high-low switching device is in the high gear position and the center differential is in the differential lock state, a L4F mode in which the high-low switching device is in the low gear position and the center differential is in the free state, and a L4L mode in which the high-low switching device is in the low gear position and the center differential is in the differential lock state. The creep control portion is configured to allow the execution of the creep cut in the H4F mode, and to inhibit the execution of the creep cut in the H4L mode, the L4F mode and the L4L mode, and is configured to inhibit the execution of the creep cut when the low gear position is selected by the high-low selection device even in the H4F mode.

According to a fourth aspect of the present invention, in the control apparatus according to the third aspect of the present invention, the creep control portion is configured to inhibit the execution of the creep cut, (a) when a high-low switching control is being executed for switching between the high gear position and the low gear position of the high-low switching device in accordance with selection made by the high-low selection device, (b) when the high-low switching device is in the low gear position, and/or (c) when the center differential is in the differential lock state.

In such a control apparatus for the electric vehicle, when the low gear position is selected by the high-low selection device during the execution of the creep cut, the creep cut is stopped, and thus the electric motor is controlled to generate the creep torque. Therefore, when the high-low switching device is switched from the high gear position to the low gear position by the dog clutch in accordance with the selection of the low gear position by the high-low selection device, and the dog clutch is placed into the neutral state, meshing teeth on input side, i.e., meshing teeth on low gear side, are rotated by the creep torque, so that the dog clutch is reliably engaged with the meshing teeth on the low gear side whereby the high-low switching device is appropriately switched to the low gear position.

In the second aspect of the present invention, the engine is provided as the other power source in addition to the electric motor and the torque converter is provided between the power sources and the high-low switching device, the creep torque can be generated by the torque converter by rotating the electric motor at the predetermined speed.

In the third aspect of the present invention, the creep cut is allowed in the H4F mode to improve the fuel economy, whereas the creep cut is inhibited in the H4L mode, L4F mode and L4L mode to obtain an excellent power performance owing to the creep torque, thereby improving the running performance in a poorly conditioned road such as a muddy road. Further, when the low gear position is selected by the high-low selection device in the H4F mode in which the creep cut is allowed, the creep cut is inhibited. Therefore, by controlling the electric motor to generate the creep torque, the dog clutch is reliably engaged with the meshing teeth on the low gear side, so that the high-low switching device is appropriately switched to the low gear position.

In the fourth aspect of the present invention, the creep cut is inhibited when (a) when the high-low switching control is being executed for switching between the high gear position and the low gear position of the high-low switching device, (b) when the high-low switching device is in the low gear position, and/or (c) when the center differential is in the differential lock state. Thus, the effects of the third aspect of the present invention can be appropriately obtained.

DETAILED DESCRIPTION OF PREFERRED EMBODIMENTS

The present invention is applicable to an electric vehicle including at least an electric motor as a power source, namely, applicable to an electric vehicle including only an electric motor and a hybrid electric vehicle including an electric motor and an engine (internal combustion engine) as power sources. As the electric motor, a motor generator that also functions as a generator is suitable, but an electric motor that does not function as a generator can also be employed. As the high-low switching device and the center differential, for example, a single-pinion-type or a double-pinion-type planetary gear device is used, but a parallel-shaft-type high-low switching device, a bevel-gear-type center differential or the like may be used. The high-low switching device is provided with a dog clutch, and the dog clutch preferably has a synchronization mechanism, but the synchronization mechanism may be omitted. The differential lock device may also employ a dog clutch having a synchronization mechanism, but may employ a dog clutch without a synchronization mechanism or a friction-engagement-type clutch. In a case in which a fluid transmission device such as a torque converter is provided between the electric motor and the high-low switching device, the creep torque can be generated by rotating the electric motor at a predetermined speed. In a case in which the fluid transmission device is not provided, the creep torque can be generated by the torque of the electric motor.

The running-mode switching control portion is configured to switch among four running modes consisting of the H4F mode, H4L mode, L4F mode and L4L mode, namely, establish one of the four running modes which is selected in accordance with selection made by the high-low selection device and selection made by the differential-state selection device. However, the running-mode switching control portion may switch among only three running modes consisting of the H4F mode, L4F mode and L4L mode, or consisting of the H4F mode, H4L mode and L4L mode. For example, the control portion is configured to allow the creep cut in the H4F mode and to inhibit the creep cut in the H4L mode, L4F mode and L4L mode, but may be configured to allow the creep cut in the H4F mode and H4L mode and to inhibit the creep cut in the L4F mode and L4L mode. In this case, for example, when the H4L mode is to be switched to the L4L mode, too, the creep cut may be stopped at a stage at which the low gear position is selected by the high-low selection device.

Embodiments

Embodiments of the present invention will be described in detail below with reference to the drawings.

Figure 1:
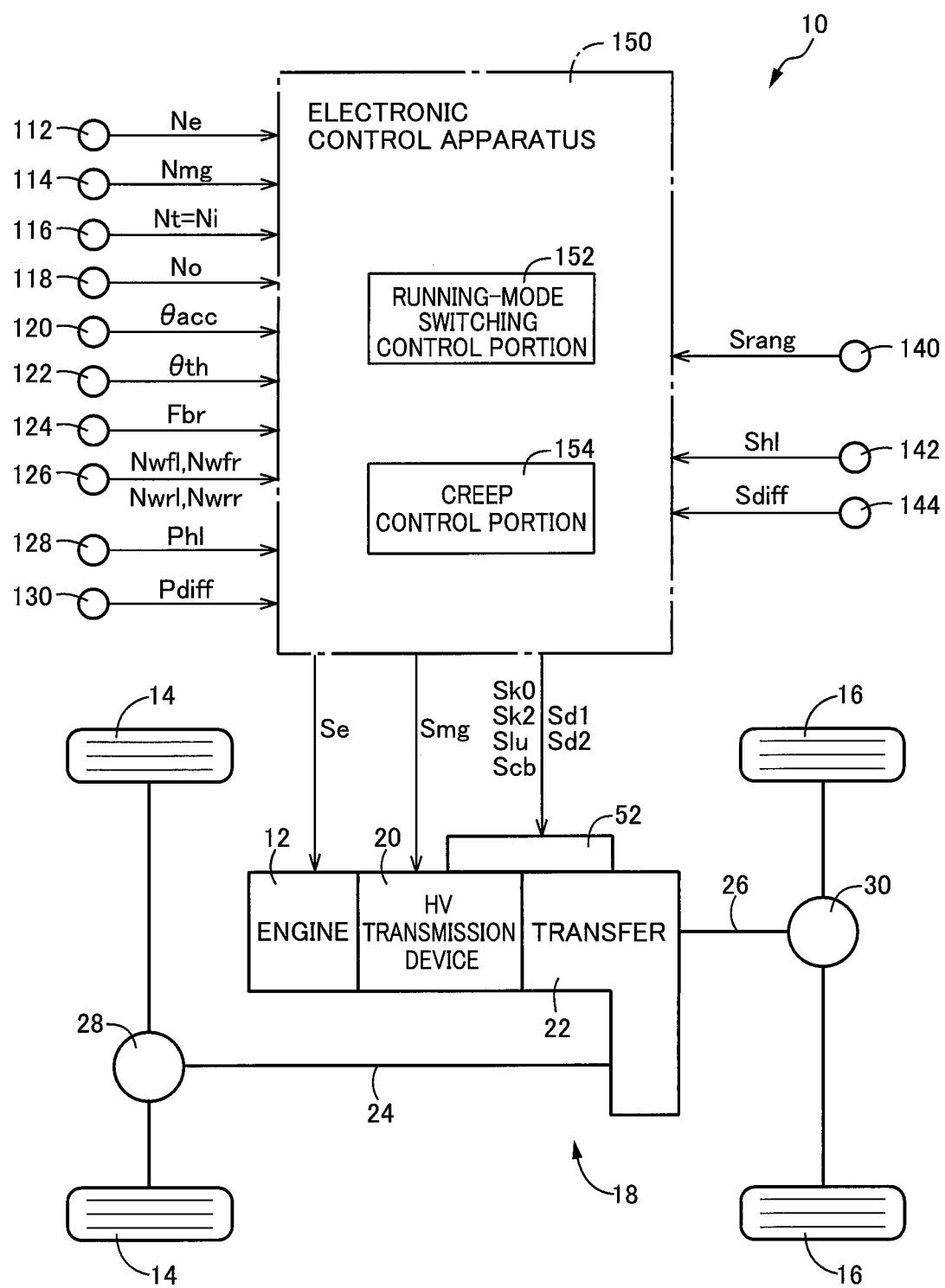
FIG. 1 is a view showing a schematic configuration of a drive system of a front and rear wheel drive electric vehicle to which the present invention is applied, and also showing a main part of a control function.

FIG. 1 is a schematic view for explaining a drive system of an electric vehicle 10 to which the present invention is applied, and also shows a main part of control functions for various controls in the vehicle 10. The vehicle 10 is a hybrid front-rear wheel drive (four wheel drive) electric vehicle based on a front-engine rear-wheel drive (FR) system. The vehicle 10 includes an engine 12, a pair of left and right front wheels 14, a pair of left and right rear wheels 16 and a power transmission device 18. The power transmission device 18 includes an HV transmission device 20 connected to the engine 12 and a transfer 22 connected to the HV transmission device 20. A drive force transmitted from the engine 12 and the HV transmission device 20 to the transfer 22 is distributed to a front propeller shaft 24 and a rear propeller shaft 26, and is transmitted from the front propeller shaft 24 to the left and right front wheels 14 via a differential 28, while being transmitted from the rear propeller shaft 26 to the left and right rear wheels 16 via a differential 30. The engine 12 is an internal combustion engine such as a gasoline engine, and is used as a power source for driving the vehicle 10. An engine torque Te, which is a torque of the engine 12, is controlled by an engine control signal Se output from an electronic control apparatus 150.

Figure 2:
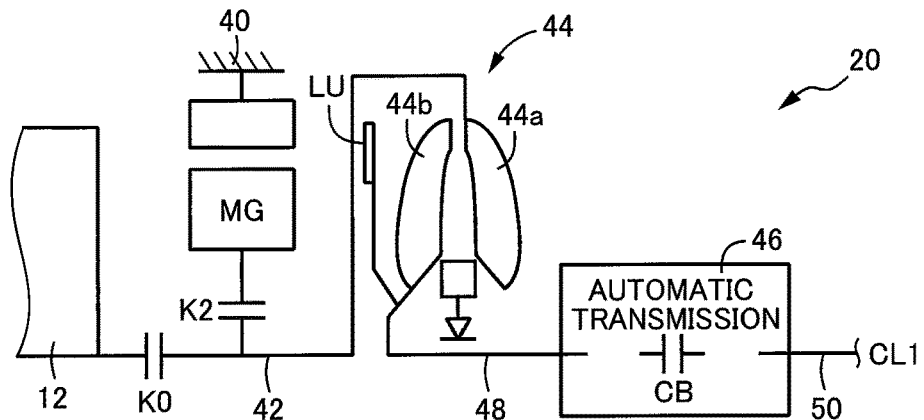
FIG. 2 is a schematic view showing a specific example of an HV transmission device shown in FIG. 1.

FIG. 2 is a schematic view showing a specific example of the HV transmission device 20. The HV transmission device 20 includes an electric motor MG, a motor connection shaft 42, a torque convertor 44, and an automatic transmission 46 that are disposed on a common first axis CL1 in a casing 40 that is a non-rotating member. Each of the electric motor MG and the torque convertor 44 is constructed substantially symmetrically with respect to the first axis CL1, and its lower half located on a lower side of the first axis CL1 is not shown in FIG. 2.

An engine connection/disconnection clutch K0 is provided between the engine 12 and the motor connection shaft 42. The electric motor MG used as another power source for driving the vehicle 10 together with the engine 12 is connected to the motor connection shaft 42 via a motor connection/disconnection clutch K2. The engine connection/disconnection clutch K0 and the motor connection/disconnection clutch K2 are hydraulic friction engagement devices, and engagement hydraulic pressures supplied to the clutches K0, K2 from a hydraulic control circuit 52 (see FIG. 1) are controlled by a K0 switching signal Sk0 and a K2 switching signal Sk2, respectively, which are outputted from the electronic control apparatus 150, whereby operation states of the respective clutches K0, K2 are switched individually from each other. The hydraulic control circuit 52 includes an electric hydraulic pump in addition to an electromagnetic switching valve and an electromagnetic pressure regulating valve, and can output a predetermined hydraulic pressure even when the vehicle 10 is stopped. The electric motor MG is a motor generator having a function as a generator, and is connected to a power storage device via an inverter (not shown). An MG torque Tmg, which is a torque of the electric motor MG, is controlled by an MG control signal Smg output from the electronic control apparatus 150.

The torque convertor 44 includes a pump impeller 44a connected to the motor connection shaft 42 and a turbine impeller 44b connected to a transmission input shaft 48. The torque convertor 44 is a fluid type transmission device configured to transmit the power from the engine 12 and/or the electric motor MG, which are the power sources, to the transmission input shaft 48 via fluid. The torque convertor 44 includes a lock-up clutch LU configured to connect between the pump impeller 44a and the turbine impeller 44b. The lock-up clutch LU is a hydraulic friction engagement device, such that an operation state of the lock-up clutch LU is switched by the engagement hydraulic pressure supplied from the hydraulic control circuit 52 and controlled by an LU control signal Slu outputted from the electronic control apparatus 150.

The automatic transmission 46 is a known planetary-gear-type automatic transmission that includes, for example, one or more sets of planetary gear devices and a plurality of engagement devices CB. Each of the engagement devices CB is a hydraulic friction engagement device, such that an engagement hydraulic pressure supplied from the hydraulic control circuit 52 is controlled by a CB control signal Scb outputted from the electronic control apparatus 150, whereby an operation state of the engagement devices CB is switched. The automatic transmission 46 is a step-variable transmission capable of establishing a plurality of gear positions having different gear ratios γ (=AT input rotational speed Ni/AT output rotational speed No) in accordance with the operation states of the respective engagement devices CB. The AT input rotational speed Ni is a rotational speed of the transmission input shaft 48, and is the same value as a turbine rotational speed Nt that is an output rotational speed of the torque convertor 44. The AT output rotational speed No is a rotational speed of a transmission output shaft 50.

Figure 3:
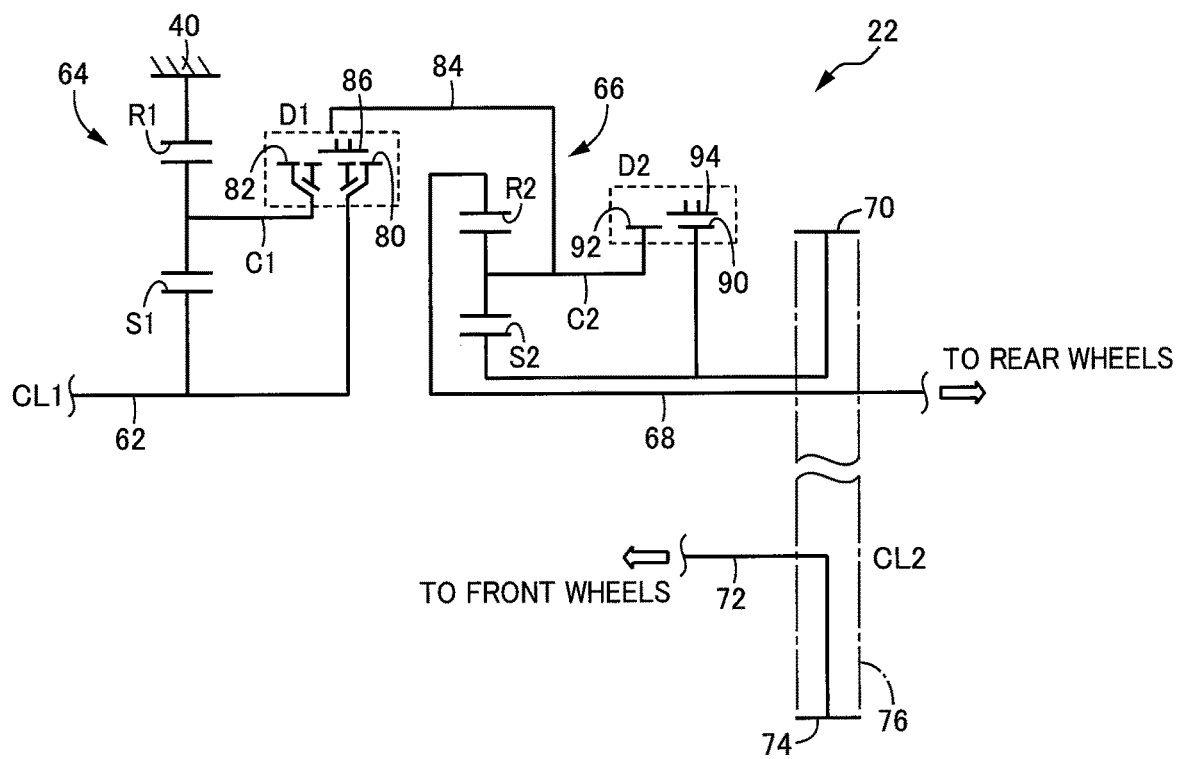
FIG. 3 is a schematic view showing a specific example of a transfer shown in FIG. 1.

FIG. 3 is a schematic view showing a specific example of the transfer 22. The transfer 22 includes a TF input shaft 62 connected to the transmission-output shaft 50, a high-low switching device 64, a center differential 66, a rear-wheel-side output shaft 68 and a sprocket-shaped drive gear 70 for outputting the drive power to the front wheels 14, which are disposed on the first axis CL1 common to the HV transmission device 20. The drive force is transmitted from the rear-wheel-side output shaft 68 to the rear propeller shaft 26. On a second axis CL1 parallel to the first axis CL2, the transfer 22 further includes a front-wheel-side output shaft 72 and a sprocket-shaped driven gear 74 integrally provided on the front-wheel-side output shaft 72. A chain 76 is wound around the drive gear 70 and the driven gear 74, and the drive power is transmitted from the center differential 66 to the front-wheel-side output shaft 72 via the drive gear 70, the chain 76 and the driven gear 74. The drive power is transmitted from the front-wheel-side output shaft 72 to the front propeller shaft 24.

The high-low switching device 64 includes a single-pinion-type planetary gear device having a sun gear S1, a carrier C1 and a ring gear R1, and a high-low switching clutch D1. The sun gear S1 is connected to the TF input shaft 62, and the ring gear R1 is fixed to the casing 40. The high-low switching clutch D1 is a dog clutch with a synchronization mechanism, and includes high-gear-side meshing teeth 80 provided on the TF input shaft 62, low-gear-side meshing teeth 82 provided on the carrier C1, and an HL switching sleeve 86 provided with meshing teeth which are disposed on an HL output member 84 so as to be relatively non-rotatable and movable in the axial direction and which are to be selectively engaged with the meshing teeth 80, 82. The HL switching sleeve 86 switches between a high gear position Hi and a low gear position Lo in the high-low switching device 64, by being moved in the axial direction by a hydraulic actuator. When the high gear position Hi is established in the high-low switching device 64, with the meshing teeth of the HL switching sleeve 86 being engaged with the high-gear-side meshing teeth 80, the TF input shaft 62 and the HL output member 84 are connected to each other. When the low gear position Lo is established in the high-low switching device 64, with the meshing teeth of the HL switching sleeve 86 being engaged with the low-gear-side meshing teeth 82, the carrier C1 and the HL output member 84 are connected to each other. The hydraulic pressure supplied from the hydraulic control circuit 52 is controlled by a D1 switching signal Sd1 outputted from the electronic control apparatus 150, whereby the HL switching sleeve 86 is moved in the axial direction and the high-low switching device 64 is switched between the high gear position Hi and the low gear position Lo. Between the high gear position Hi and the low gear position Lo, the meshing teeth of the HL switching sleeve 86 are not engaged with any of the meshing teeth 80, 82, so that a neutral state is established in which power transmission is interrupted.

The center differential 66 includes a single-pinion-type planetary gear device having a sun gear S2, a carrier C2 and a ring gear R2. The carrier C2 is connected to the HL output member 84 so as to be rotationally driven. Further, the ring gear R2 is connected to the rear-wheel-side output shaft 68, and the sun gear S2 is connected to the drive gear 70, so that the rotation of the HL output member 84 is transmitted to the front wheels 14 and the rear wheels 16 in a differentially rotatable manner, i.e., in a manner allowing differential rotation between the front wheels 14 and the rear wheels 16.

A differential-lock clutch D2 is provided between the sun gear C2 and the sun gear S2 of the center differential 66, and serves as a differential-lock device for limiting the differential-rotation. The differential-lock clutch D2 is a dog clutch without synchronization mechanism, and includes meshing teeth 90 provided on the sun gear S2, meshing teeth 92 provided on the carrier C2, and a differential lock sleeve 94 disposed movably in the axial direction and provided with meshing teeth to be engaged with the meshing teeth 90, 92. The differential lock sleeve 94 is constantly engaged with the meshing teeth 90, and switches between a differential lock state and a free state by being moved in the axial direction by a hydraulic actuator. When the differential lock state is established with the meshing teeth of the differential lock sleeve 94 being engaged with the meshing teeth 92, the sun gear S2 and the carrier C2 are connected to each other in a relatively non-rotatable manner. When the free state is established with the meshing teeth of the differential lock sleeve 94 being disengaged from the second engaging teeth 92, the sun gear S2 and the carrier C2 are allowed to be rotated relative to each other, namely, the differential rotation of the center differential 66 is allowed. The hydraulic pressure supplied from the hydraulic control circuit 52 is controlled by a D2 switching signal Sd2 outputted from the electronic control apparatus 150, such that the differential lock sleeve 94 is moved in the axial direction so as to switch between the differential lock state and the free state in the center differential 66.

The vehicle 10 includes the electronic control apparatus 150 as a control apparatus for controlling operations of the engine 12, the HV transmission device 20 and the transfer 22, for example. The electronic control apparatus 150 includes a so-called microcomputer including a CPU, a RAM, a ROM and an input/output interface, and executes various kinds of controls by performing signal processing in accordance with a program pre-stored in the ROM.

Various kinds of information necessary for the controls are supplied to the electronic control apparatus 150 from various sensors provided in the vehicle 10. For example, an engine speed sensor 112, an MG speed sensor 114, an AT input speed sensor 116, an AT output speed sensor 118, an accelerator-opening degree sensor 120, a throttle-opening degree sensor 122, a braking force sensor 124, wheel speed sensors 126, a high-low state detection sensor 128 and a differential-state detection sensor 130 supply respective signals indicating an engine rotational speed Ne, an MG rotational speed Nmg, an AT input rotational speed Ni, an AT output rotational speed No, an accelerator opening degree θacc corresponding to an amount of depression of an accelerator pedal, a throttle-valve opening degree θth that is an opening degree of an electronic throttle valve of the engine 12, a braking force Fbr corresponding to a force of depression of a brake pedal, wheel speeds Nwfl, Nwfr, Nwrl, Nwrr of the respective front and rear wheels 14, 16, a high-low state Phl indicating whether the high-low switching device 64 is in the high gear position Hi or low gear position Lo, and a differential state Pdiff indicating whether the center differential 66 is in the free state or differential lock state. A running speed V of the vehicle 10 can be obtained based on the wheel speeds Nwfl, Nwfr, Nwrl, Nwrr.

The electronic control apparatus 150 is also supplied with a selected range signal Srang, a high-low selection signal Shl and a differential-state selection signal Sdiff from a range selection device 140, a high-low selection device 142 for selecting one of the high gear position Hi and the low gear position Lo which is to be established in the high-low switching unit 64 is in the high gear position Hi or the low gear position Lo, and a differential-state selection device 144 for selecting one of the free state or the differential lock state which is to be established in the center differential 66. The range selection device 140, the high-low selection device 142 and the differential-state selection device 144 are all disposed in the vicinity of a vehicle driver's seat and to be operated by the vehicle driver. The range selection device 140 may be a shift lever, for example, and can select a D range that enables forward running of the vehicle 10, an R range that enables reverse running of the vehicle 10, a P range that enables parking of the vehicle 10, for example. The high-low selection device 142 may be, for example, a low-gear selection switch which is to be operated to select the low gear position Lo, such that the high-gear position Hi is selected when it is not operated. The differential-state selecting device 144 may be, for example, a differential-lock selecting switch which is to be operated to select the differential lock state, such that the free state is selected when it is not operated. The high-low selection device 142 and the differential-state selection device 144 are operated to place the high-low switching device 64 into the low gear position Lo and to place the center differential 66 into the differential lock state, for example, when the running performance is to be enhanced in a poorly conditioned road surface such as a muddy road.

The electronic control apparatus 150 calculates a requested drive torque or the like, based on the accelerator opening degree θ acc and the vehicle running speed V, for example, controls the engine torque Te and MG torque Tmg so as to obtain the requested drive torque or the like, and executes a shift control of the automatic transmission 46 in accordance with a predetermined shift map. The electronic control apparatus 150 functionally includes a running-mode switching control portion 152 for switching a plurality of running modes having different operating states of the transfer 22, and a creep control portion 154 for generating a creep torque during stop of the vehicle 10 or during running of the vehicle 10 at a low speed equal to or lower than a predetermined speed value.

Figures 4, 5:
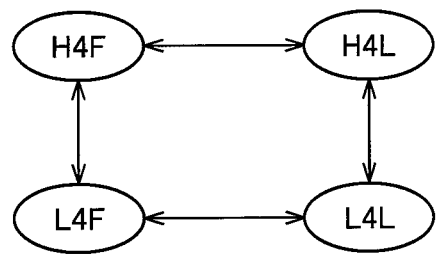
FIG. 4 is a view showing a plurality of running modes of the electric vehicle of FIG. 1.
FIG. 5 is a view showing a switching pattern of a plurality of running modes in FIG. 4.

The running-mode switching control portion 152 changes the operation states of the high-low switching device 64 and the differential lock clutch D2 in accordance with the selection made by the high-low selection device 142 and the selection made by the differential-state selection device 144, thereby switching four running modes in the transfer 22. As shown in FIG. 4, the four running modes include an H4F mode, an H4L mode, an L4F mode and an L4L mode. Specifically, the H4F mode is established with the high-low switching device 64 being in the high gear position Hi and with the center differential 66 being in the free state, the H4L mode is established with the high-low switching device 64 being in the high gear position Hi and with the center differential 66 being in the differential lock state, the L4F mode is established with the high-low switching device 64 being in the low gear position Lo and with the center differential 66 being in the free state, and the L4L mode is established with the high-low switching device 64 being in the low gear position Lo and with the center differential 66 is in the differential lock state. As shown in FIG. 5, any one of the H4F mode, H4L mode, L4F mode and L4L mode is switchable to two of the other three modes, with the high-low switching device 64 and the differential lock clutch D2 being separately switched in accordance with the respective selection operations of the high-low selection device 142 and the differential-state selection device 144. Any one of the H4F mode, H4L mode, L4F mode and L4L mode is not switchable directly to another one of the other three modes, because the high-low switching device 64 and the differential lock clutch D2 are not simultaneously switched.

The creep control portion 154 executes a creep control for controlling the electric motor MG such that a predetermined creep torque Tcreep is generated during stop of the vehicle 10 or during running of the vehicle 10 at a low speed not higher than a predetermined speed value, where the predetermined creep torque Tcreep is a torque that enables the vehicle 10 to creep run on a flat road. In the present embodiment, since the torque converter 44 is disposed between the motor MG and the transfer 22, the creep torque Tcreep is generated by the torque converter 44 by causing the electric motor MG to be rotated at a predetermined creep speed Nmgc. When a predetermined creep cut condition is satisfied, for example, when the braking force Fbr is equal to or larger than a predetermined value and the vehicle driver can be considered to have no intention to start the vehicle 10, for example, during stop of the vehicle 10, the creep control portion 154 executes a creep cut to stop the creep control in order to suppress energy consumption due to the creep torque Tcreep. In the present embodiment, the creep cut can be executed by stopping the rotation of the electric motor MG.

On the other hand, when the creep cut is executed in this way, the power performance such as a drive power responsiveness is reduced. Therefore, the creep cut is inhibited when a predetermined power performance is required. In the present embodiment, as shown in FIG. 4, the creep cut is allowed only in the H4F mode that is one of the four running modes. In the H4F mode, it is considered that high power performance is not required so that the creep cut is allowed with higher priority being given to energy efficiency (fuel economy). Meanwhile, in the H4L mode, L4F mode and L4L mode, the creep cut is inhibited with higher priority being given to power performance rather than to energy efficiency.

Here, since the creep cut is allowed in the H4F mode, it is assumed that the low gear position Lo is selected by the high-low selection device 142 in the H4F mode in a creep cut state and the high-low switching device 64 is switched from the high gear position Hi to the low gear position Lo by the high-low switching clutch D1. In this case, even if the meshing teeth of the HL switching sleeve 86 are disengaged from the high-gear-side meshing teeth 80 and the high-low switching device 64 is placed into a neutral state, an input-side rotation of the high-low switching clutch D1 is stopped due to the creep cut and an output-side rotation of the high-low switching clutch D1 is stopped due to stop of the vehicle 10. Therefore, there is a possibility that the meshing teeth of the HL switching sleeve 86 cannot mesh with the low-gear-side meshing teeth 82, so that the high-low switching device 64 cannot be switched to the low gear position Lo.

Figure 6:
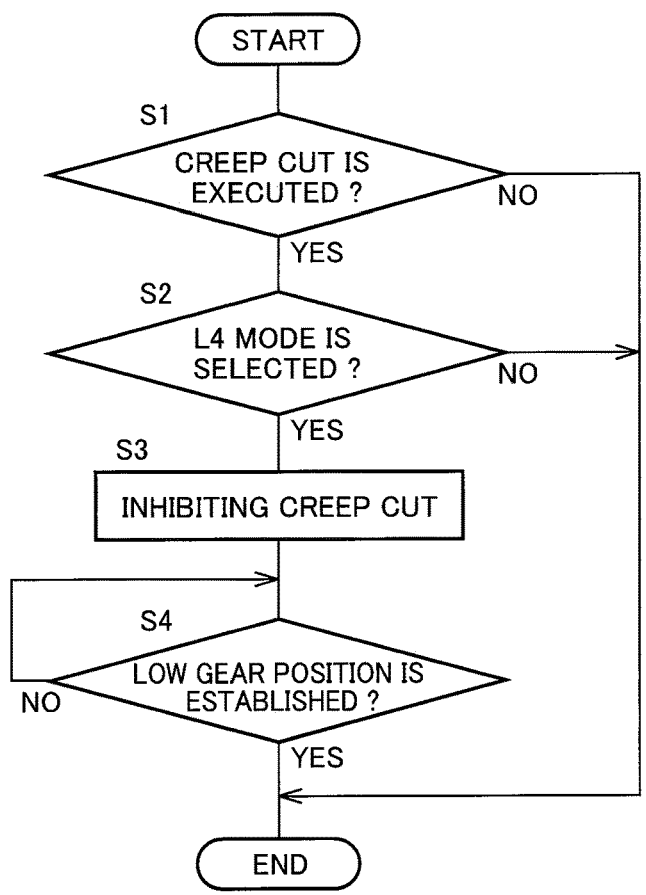
FIG. 6 is a flowchart showing a control routine executed by a creep control portion shown in FIG. 1.

On the other hand, in the present embodiment, the creep control portion 154 is configured to execute a control routine including steps S1 to S4 that are shown in flowchart of FIG. 6. The creep cut is inhibited under a certain condition. In the flowchart of FIG. 6, "YES" and "NO" in each of determination steps S1, S2 and S4 (represented by rhombus shapes) represent affirmative determination and negative determination, respectively.

As shown in FIG. 6, the control routine is initiated with step S1 that is implemented to determine whether the creep cut is being executed or not. When the creep cut is not being executed, one cycle of execution of the control routine is terminated. When the creep cut is being executed, step S1 is followed by step S2. Since the creep cut is allowed only in the H4F mode, the determination made at this step S1 is substantially a determination as to whether the creep cut is being executed or not in the H4F mode. Step S2 is implemented to determine whether L4 mode is selected or not, specifically, whether the low gear position Lo is selected by the high-low selection device 142 or not, based on the high-low selection signal Shl. When the low gear position Lo is selected, step S3 is implemented. That is, the L4 mode substantially means the L4F mode, so that, when the H4F mode is switched to the L4F mode, an affirmative determination is made at step S2 whereby steps S3 and S4 are implemented.

At step S3, the creep cut is inhibited. At step S4, it is determined whether or not the meshing teeth of the HL switching sleeve 86 of the high-low switching clutch D1 are engaged with the low-gear-side meshing teeth 82 and the low gear position Lo is established in the high-low switching device 64. Specifically, based on the signal indicating the high-low state Phl supplied from the high-low state detection sensor 128, it is determined whether the low-gear position Lo is established in the high-low switching device 64. When an affirmative determination is made at step S4 as a result of establishment of the low-gear position Lo, a series of control operations related to the creep control at the time of switching transition to the L4 mode is terminated. In this case, since the creep cut is inhibited at step S3, the creep control is executed to cause the electric motor MG to be rotated at the creep speed Nmgc, whereby the creep torque Tcreep is applied or inputted to the high-low switching clutch D1. Therefore, when the meshing teeth of the HL switching sleeve 86 are disengaged from the high-gear-side meshing teeth 80 and the high-low switching device 64 is placed into the neutral state, the low-gear-side meshing teeth 82 are rotated based on the creep torque Tcreep, so that the meshing teeth of the HL switching sleeve 86 are appropriately engaged with the low-gear-side meshing teeth 82 to establish the low gear position Lo in the high-low switching device 64.

Figure 7:
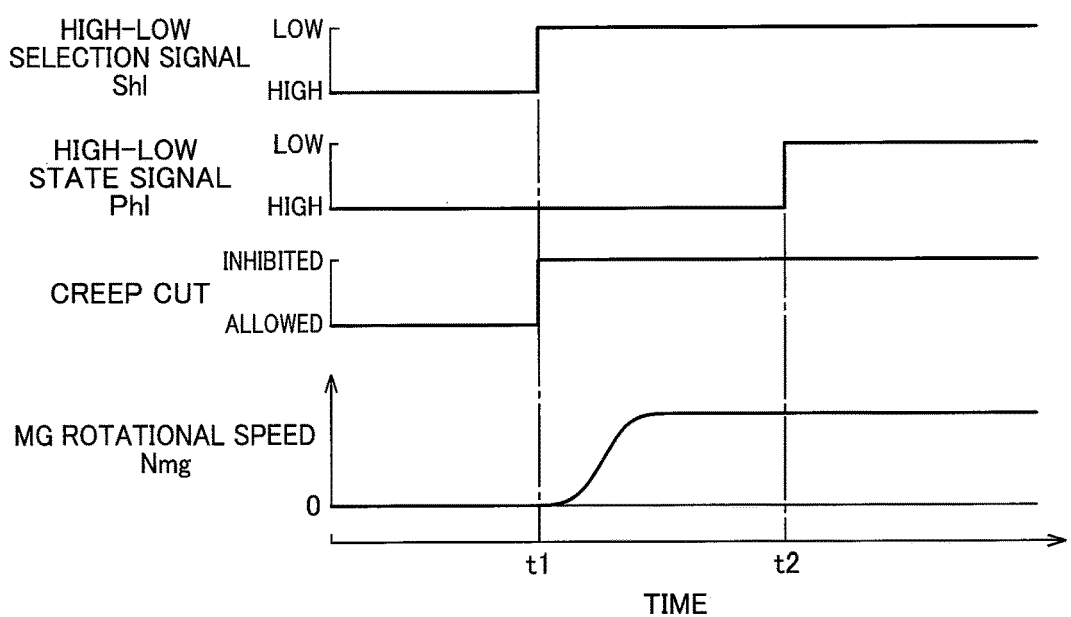
FIG. 7 is an example of a time chart showing change in an operating state of each part when a creep cut is inhibited in the control routine shown in the flowchart of FIG. 6.

FIG. 7 is an example of a time chart showing a change in the operating state of each part when the creep cut is inhibited and the mode is switched to the L4 mode in the control routine shown in the flowchart of FIG. 6. A time t1 is a point of time at which the low gear position Lo is selected by the high-low selection device 142 during the execution of the creep cut, the affirmative determination is made at step S2 and step S3 is implemented. A time t2 is a point of time at which the meshing teeth of the HL switching sleeve 86 is engaged with the low-gear-side meshing teeth 82 to establish the low gear position Lo, and switching to the low gear position Lo is detected based on the signal indicating the high-low state Phl.

As described above, according to the creep control portion 154 of the vehicle 10 of the present embodiment, when the low gear position Lo is selected by the high-low selection device 142 during the execution of the creep cut (the determination at step S2 is affirmative), the creep cut is stopped (at step S3), so that the electric motor MG is controlled so as to generate the creep torque Tcreep. Therefore, when the high-low switching clutch D1 switches the high-low switching device 64 from the high gear position Hi to the low gear position Lo in association with the selection of the low gear position Lo, and the high-low switching device 64 is placed into the neutral state, the low-gear-side meshing teeth 82 are rotated by the creep torque Tcreep, whereby the meshing teeth of the HL switching sleeve 86 is reliably engaged with the low-gear-side meshing teeth 82, and the high-low switching device 64 is appropriately switched to the low gear position Lo.

The torque converter 44 is provided between the electric motor MG and the high-low switching device 64, so that the creep torque Tcreep can be generated by the torque converter 44 by rotating the electric motor MG at the creep speed Nmgc.

In addition, in the H4F mode, the creep cut is allowed to improve the fuel economy, whereas in the H4L mode, the L4F mode, and the L4L mode, the creep cut is inhibited. Therefore, the creep torque Tcreep provides an excellent power performance, thereby improving the running performance in a poorly conditioned road such as a muddy road. Further, when the low gear position Lo is selected by the high-low selection device 142 in the H4F mode in which the creep cut is allowed, the creep cut is inhibited (at step S3). Therefore, by controlling the electric motor MG to generate the creep torque Tcreep, the meshing teeth of the HL switching sleeve 86 of the high-low switching clutch D1 is reliably engaged with the low-gear-side meshing teeth 82, and the high-low switching device 64 is appropriately switched to the low gear position Lo.

In the above-described embodiment, the creep cut is inhibited when the low gear position Lo is selected during the execution of the creep cut. However, a creep-cut inhibition condition for inhibiting the creep cut may be set in advance as in a control routine shown in a flowchart of FIG. 8, so that whether or not the creep cut is allowed may be determined depending on whether or not the creep-cut inhibition condition is satisfied. That is, it is determined whether or not the creep-cut inhibition condition is satisfied at step SS1. When the creep-cut inhibition condition is satisfied (established), the creep cut is inhibited at step SS2. When the creep-cut inhibition condition is not satisfied, the creep cut is allowed at step SS3.

The creep-cut inhibition condition is satisfied (i) when the high-low switching control is being executed for switching between the high gear position Hi and the low gear position Lo of the high-low switching device 64 in accordance with selection made by the high-low selection device 142, (ii) when the high-low switching device 64 is in the low gear position Lo, and/or (iii) when the center differential 66 is in the differential lock state. It can be determined that the high-low switching device 64 is in the low gear position Lo based on the signal indicating the high-low state Phl, and it can be determined that the center differential 66 is in the differential lock based on the signal indicating the differential state Pdiff. For determining whether or not the high-low switching device 64 is under the high-low switching control, for example, it is possible to provide a high-low switching flag Fhl that is turned ON when the high-low switching device 64 is under the high-low switching control, such that the high-low switching flag Fhl is to be switched ON and OFF based on the high-low switching control executed by the running-mode switching control portion 152.

Figure 8:
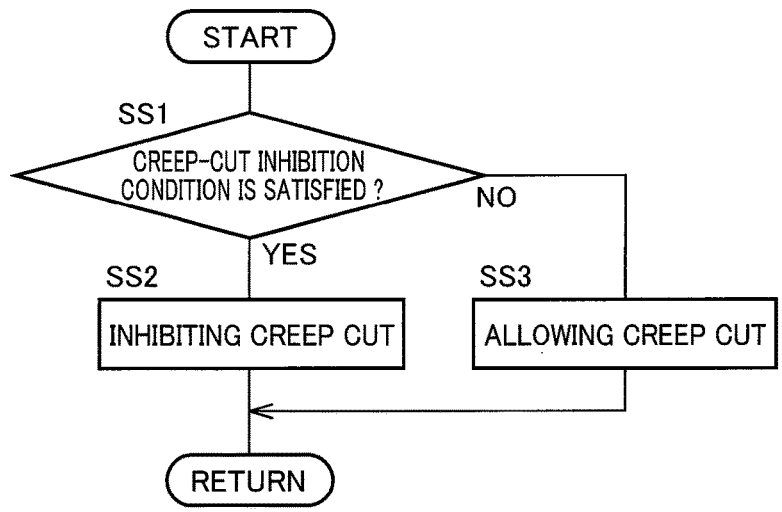
FIG. 8 is a flowchart showing a control routine executed by a creep control portion shown in FIG. 1, in another embodiment of the present invention.
Figure 9:
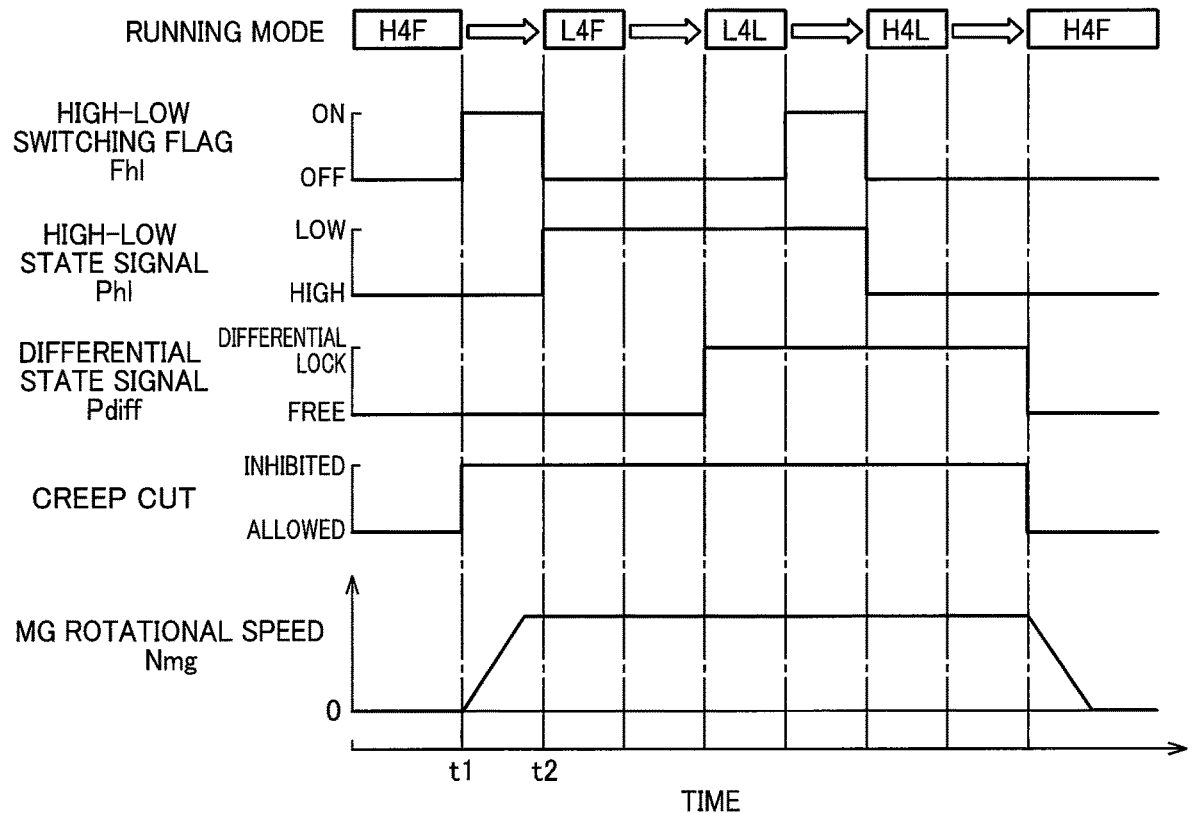
FIG. 9 is an example of a time chart showing change in an operating state of each part when it is determined whether the creep cut is to be allowed or inhibited in the control routine shown in the flowchart of FIG. 8.

FIG. 9 is an example of a time chart showing changes in the operating state of each part when the plurality of running modes H4F mode, H4L mode, L4F mode and L4L mode are switched while the creep control is executed by determining whether the creep cut is to be allowed or inhibited in the control routine shown in the flowchart of FIG. 8. Also in this case, when the low gear position Lo is selected by the high-low selection device 142 in the H4F mode in which the creep cut is allowed, the high-low switching control is executed by the running-mode switching control portion 152, whereby the high-low switching flag Fhl is turned ON whereby the creep cut is inhibited (at time t1). Accordingly, when the electric motor MG is controlled so as to generate the creep torque Tcreep, the meshing teeth of the HL switching sleeve 86 of the high-low switching clutch D1 is reliably engaged with the low-gear side meshing teeth 82, and the high-low switching device 64 is appropriately switched to the low gear position Lo so that the running mode can be switched to the L4F mode (at time t2). That is, substantially the same effects as those of the above-described embodiment can be obtained.

While the embodiments of the present invention have been described in detail with reference to the drawings, the embodiments are merely illustrative, and various changes and modifications may be made to the embodiments.

NOMENCLATURE OF ELEMENTS

10: electric vehicle
12: engine
14: front wheel
16: rear wheel
44: torque converter
64: high-low switching device
66: center differential
142: high-low selection device
144: differential-state selection device
150: electronic control apparatus (control apparatus)

152: running-mode switching control portion
154: creep control portion
MG: electric motor
D1: high-low switching clutch (dog clutch)
D2: differential lock clutch (differential lock device)

What is claimed is:

1. A control apparatus for an electric vehicle that includes (i) front and rear wheels, (ii) an electric motor as a power source, (iii) a high-low switching device configured to establish one of a high gear position and a low gear position by operation of a dog clutch so as to change a speed of rotation outputted from the power source with one of two gear ratios which corresponds to the established one of the high gear position and the low gear position, (vi) a center differential configured to transmit the rotation outputted from the high-low switching device, to the front and rear wheels, while allowing differential rotation between the front and rear wheels, and (v) a high-low selection device configured to select one of the high gear position and the low gear position which is to be established in the high-low switching device, wherein the control apparatus includes a creep control portion configured to execute a creep control for controlling the electric motor such that a creep torque is generated during stop of the vehicle, wherein the creep control portion is configured to execute a creep cut for stopping the creep control under a predetermined constant condition, and wherein the creep control portion is configured, when the low gear position is selected by the high-low selection device during execution of the creep cut, to stop the execution of the creep cut.

2. The control apparatus according to claim 1,
wherein the electric vehicle is a hybrid electric vehicle that includes (vi) an engine as another power source in addition to the electric motor and (vii) a torque converter provided between the power sources and the high-low switching device, and wherein the creep control portion is configured to cause the torque converter to generate the creep torque by rotating the electric motor at a predetermined speed, and to execute the creep cut by stopping rotation of the electric motor.

3. The control apparatus according to claim 1,
wherein the electric vehicle includes (vi) a differential lock device configured to limit allowance of the differential rotation by the center differential, and (vii) a differential-state selection device configured to select one of a free state in which the differential rotation is not limited and a differential lock state in which the differential rotation is limited by the differential lock device, wherein the control apparatus includes a running-mode switching control portion configured to switch among four running modes in accordance with selections made by the high-low selection device and the differential-state selection device, the four running modes including a H4F mode in which the high-low switching device is in the high gear position and the center differential is in the free state, a H4L mode in which the high-low switching device is in the high gear position and the center differential is in the differential lock state, a L4F mode in which the high-low switching device is in the low gear position and the center differential is in the free state, and a L4L mode in which the high-low switching device is in the low gear position and the center differential is in the differential lock state, wherein the creep control portion is configured to allow the execution of the creep cut in the H4F mode, and to inhibit the execution of the creep cut in the H4L mode, the L4F mode and the L4L mode, and wherein the creep control portion is configured to inhibit the execution of the creep cut when the low gear position is selected by the high-low selection device even in the H4F mode.

4. The control apparatus according to claim 3,
wherein the creep control portion is configured to inhibit the execution of the creep cut, when a high-low switching control is being executed for switching between the high gear position and the low gear position of the high-low switching device in accordance with selection made by the high-low selection device, when the high-low switching device is in the low gear position, and/or when the center differential is in the differential lock state.

* * * * *